United States Patent
Choi et al.

(10) Patent No.: US 12,172,599 B2
(45) Date of Patent: Dec. 24, 2024

(54) UPPER STRUCTURE OF REAR PILLAR OF VEHICLE WITH REINFORCED STIFFNESS

(71) Applicants: Hyundai Motor Company, Seoul (KR); Kia Corporation, Seoul (KR)

(72) Inventors: Jee-Hwan Choi, Gwangmyeong-si (KR); Hyung-Tae Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/341,102

(22) Filed: Jun. 26, 2023

(65) Prior Publication Data

US 2024/0190381 A1  Jun. 13, 2024

(30) Foreign Application Priority Data

Dec. 9, 2022 (KR) .................. 10-2022-0171623

(51) Int. Cl.
| | |
|---|---|
| *B60R 22/24* | (2006.01) |
| *B60J 1/10* | (2006.01) |
| *B60J 5/10* | (2006.01) |
| *B62D 25/04* | (2006.01) |
| *B62D 25/06* | (2006.01) |

(52) U.S. Cl.
CPC .............. *B60R 22/24* (2013.01); *B60J 1/10* (2013.01); *B62D 25/04* (2013.01); *B62D 25/06* (2013.01); *B60J 5/10* (2013.01)

(58) Field of Classification Search
CPC .... B60R 22/24; B60J 1/10; B60J 5/10; B62D 25/04; B62D 25/06
See application file for complete search history.

(56) References Cited

U.S. PATENT DOCUMENTS

| | | | | |
|---|---|---|---|---|
| 2011/0254317 | A1* | 10/2011 | Nakamura | B60R 22/18 296/193.06 |
| 2017/0233009 | A1* | 8/2017 | Miranda | B62D 25/04 296/193.06 |
| 2019/0016392 | A1* | 1/2019 | Lee | B62D 25/04 |
| 2020/0039586 | A1* | 2/2020 | Ayuzawa | B62D 25/08 |
| 2021/0086833 | A1* | 3/2021 | Sato | B62D 25/16 |
| 2021/0129912 | A1* | 5/2021 | Greggs | B62D 27/02 |
| 2022/0134965 | A1* | 5/2022 | Carretero Jacinto | B60R 13/025 296/1.08 |
| 2022/0219639 | A1* | 7/2022 | Kobori | B60R 22/24 |
| 2022/0281530 | A1* | 9/2022 | Lee | B60R 22/34 |
| 2022/0324413 | A1* | 10/2022 | Tchepikov | B60R 22/24 |
| 2022/0379837 | A1* | 12/2022 | Kang | B60R 22/24 |
| 2023/0067279 | A1* | 3/2023 | Muraoka | B62D 25/088 |
| 2023/0286591 | A1* | 9/2023 | Baiju | B60R 22/24 |

FOREIGN PATENT DOCUMENTS

| | | | | | |
|---|---|---|---|---|---|
| CN | 106347470 | A | * | 1/2017 | ............. B62D 25/02 |
| JP | 2000001156 | A | * | 1/2000 | ........... B60R 22/023 |
| KR | 20210129376 | A | | 10/2021 | |

* cited by examiner

*Primary Examiner* — Paul N Dickson
*Assistant Examiner* — Shams Dhanani
(74) *Attorney, Agent, or Firm* — Slater Matsil, LLP

(57) ABSTRACT

An embodiment upper structure of a rear pillar of a vehicle includes a roof side member disposed on a side surface of a roof in a length direction of the vehicle, a roof center member disposed at a rear end of the roof in a width direction of the vehicle and connected to a side surface of a rear end of the roof side member, and a seat belt mounting member connected to an end portion of the roof side member.

20 Claims, 8 Drawing Sheets

(II – II)

UPPER STRUCTURE OF REAR PILLAR OF VEHICLE WITH REINFORCED STIFFNESS

CROSS-REFERENCE TO RELATED APPLICATIONS

This application claims the benefit of Korean Patent Application No. 10-2022-0171623, filed on Dec. 9, 2022, which application is hereby incorporated herein by reference.

TECHNICAL FIELD

Exemplary embodiments of the present disclosure relate to an upper structure of a rear pillar of a vehicle with reinforced stiffness.

BACKGROUND

In order to support a roof of a vehicle, a plurality of pillars are provided on a side surface of the vehicle.

Vehicles such as sport utility vehicles (SUVs) are provided with D-pillars, that is, rear pillars, in contact with tailgates at rear ends of the vehicles.

From the point of view of a frame of a vehicle body, an upper portion of the rear pillar has a high contribution to an entirety of torsional stiffness of the vehicle body and reinforced stiffness is required as an opening of the rear end of the vehicle increases. In addition, the rear pillar is a portion where a seat belt of the rearmost row seat is mounted, and a locally reinforced stiffness is required due to mounting of the seat belt.

FIGS. 1 and 2 show an upper structure of the rear pillar according to the related art.

A roof side member 111 is disposed in a length direction of the vehicle. A rear end of the roof side member 111 is connected to a roof center member 113 disposed in a width direction of the vehicle. In addition, a glass lower member 112 for supporting a fixed glass 120 is disposed below the roof side member 111. The roof side member 111 is connected to the roof center member 113 through a partition wall member 116 (see FIG. 3). In FIG. 3, the internal shapes of the roof center member 113 and the tailgate side member 114 cut along lines C1-C1 and C2-C2 are shown. A tailgate is connected to a tailgate side member 114, and a seat belt mounting member 115 is applied to the tailgate side member 114.

However, in the upper structure of the rear pillar, since the partition wall member 116 is applied between the roof side member 111 and the roof center member 113, the roof side member 111 and the roof center member 113 are not directly connected to each other so that connectivity is poor.

Since the seat belt mounting member 115 for mounting the seat belt is also not directly connected to the glass lower member 112 and the roof side member 111, connectivity is degraded. The seat belt is mounted on the seat belt mounting member 115, and thus the seat belt mounting member 115 supports a load applied to the seat belt. However, as indicated by A in FIG. 4, the glass lower member 112 and the roof side member 111 are not directly connected so that there is a limitation in increasing stiffness of an upper portion of the rear pillar. FIG. 5 shows an example in which the seat belt mounting member 115 is disconnected from the glass lower member 112 by a gap B.

SUMMARY

Exemplary embodiments of the present disclosure relate to an upper structure of a rear pillar of a vehicle with reinforced stiffness. Particular embodiments relate to an upper structure of a rear pillar of a vehicle with reinforced stiffness, in which the number of members is integrated at a portion where a rear pillar of a vehicle is connected to a roof and connectivity between the members is reinforced.

An embodiment of the present disclosure is directed to an upper structure of a rear pillar of a vehicle with reinforced stiffness, which reinforces connectivity between members connected to an upper portion of a rear pillar of a vehicle to improve stiffness.

Other objects and advantages of embodiments of the present disclosure can be understood by the following description and become apparent with reference to the exemplary embodiments of the present disclosure. Also, it is obvious to those skilled in the art to which the present disclosure pertains that the objects and advantages of embodiments of the present disclosure can be realized by the means as claimed and combinations thereof.

In accordance with an embodiment of the present disclosure, there is provided an upper structure of a rear pillar of a vehicle with reinforced stiffness, which includes a roof side member disposed on a side surface of a roof in a length direction of a vehicle, a roof center member disposed at a rear end of the roof in a width direction of the vehicle and connected to a side surface of a rear end of the roof side member, and a seat belt mounting member connected to an end portion of the roof side member.

The roof side member may extend and may be formed to be bent to be connected to the seat belt mounting member.

The roof center member may be connected to the roof side member at a position spaced apart from the seat belt mounting member.

A rear end of the glass lower member disposed below the fixed glass in the length direction of the vehicle may be connected to a side surface of the seat belt mounting member.

The seat belt mounting member may be disposed to align with the glass lower member.

The seat belt mounting member may be connected to the glass lower member in front of a portion where the roof side member is in contact with the seat belt mounting member.

An end portion of the roof side member may extend to the seat belt mounting member, and thus the roof side member and the seat belt mounting member may be connected.

An end portion of the seat belt mounting member may extend to the roof side member, and thus the roof side member and the seat belt mounting member may be connected.

The seat belt may be installed at the seat belt mounting member.

The seat belt mounting member may be fastened to an upper portion of a tailgate side member.

DETAILED DESCRIPTION OF ILLUSTRATIVE EMBODIMENTS

Hereinafter, an upper structure of a rear pillar of a vehicle with reinforced stiffness according to embodiments of the present disclosure will be described in detail with reference to the accompanying drawings.

Figure 1:
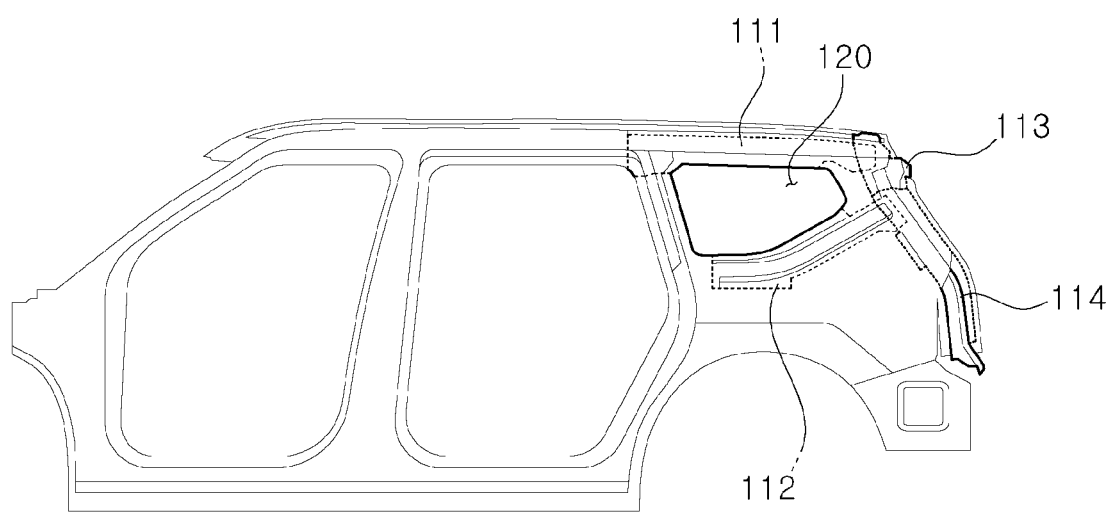
FIG. 1 is a side view illustrating a structure of a conventional vehicle.
Figure 2:
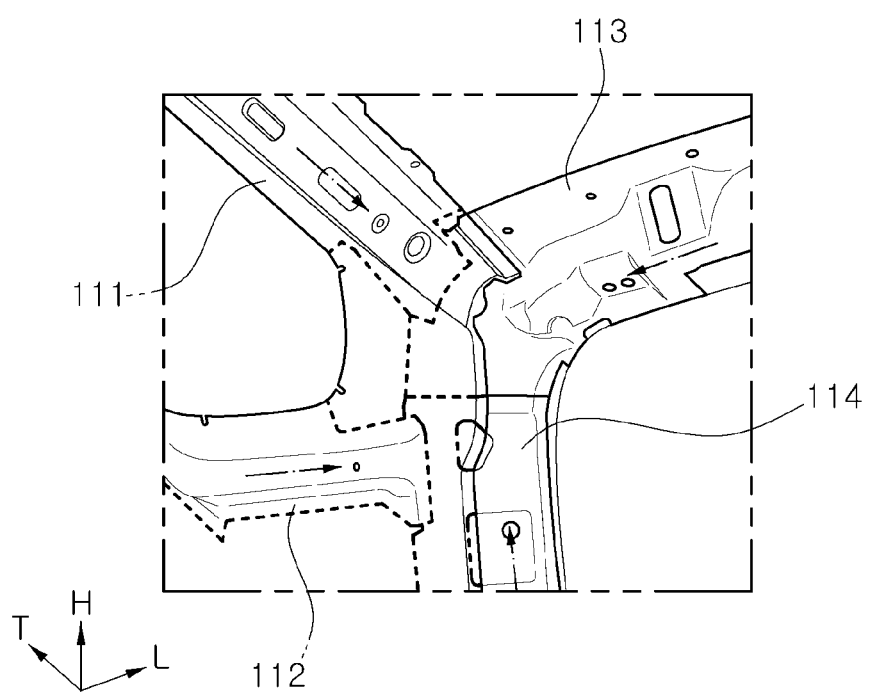
FIG. 2 is a rear perspective view illustrating a main portion of FIG. 1.
Figure 3:
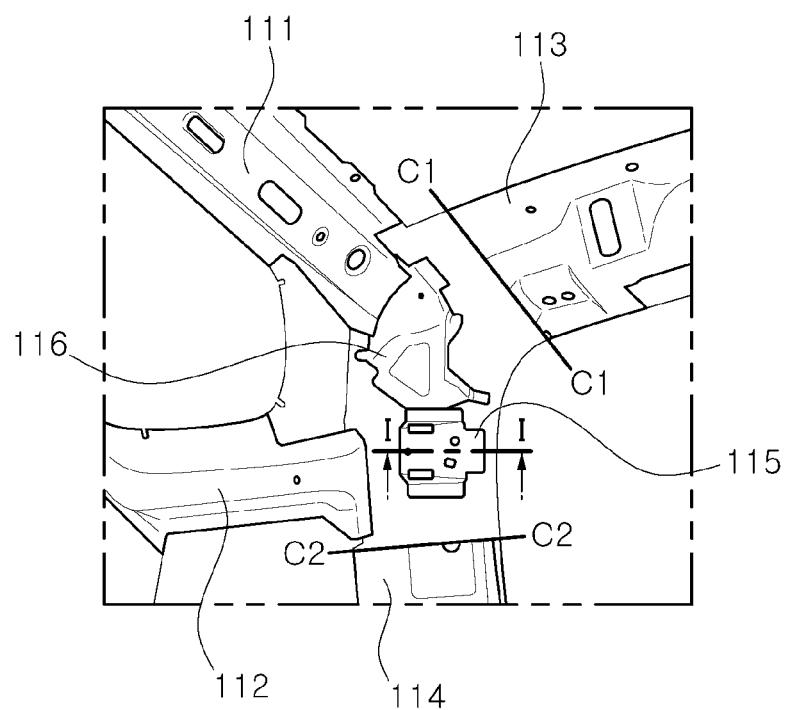
FIG. 3 is a cutaway perspective view illustrating a portion of FIG. 2.
Figure 4:
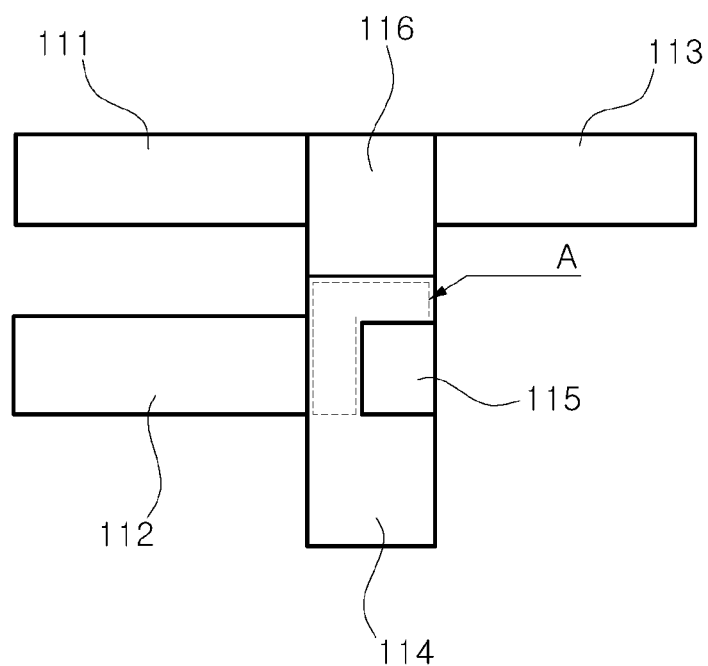
FIG. 4 is a schematic diagram illustrating a simplified model of a connection structure in an upper portion of a rear pillar.
Figure 5:
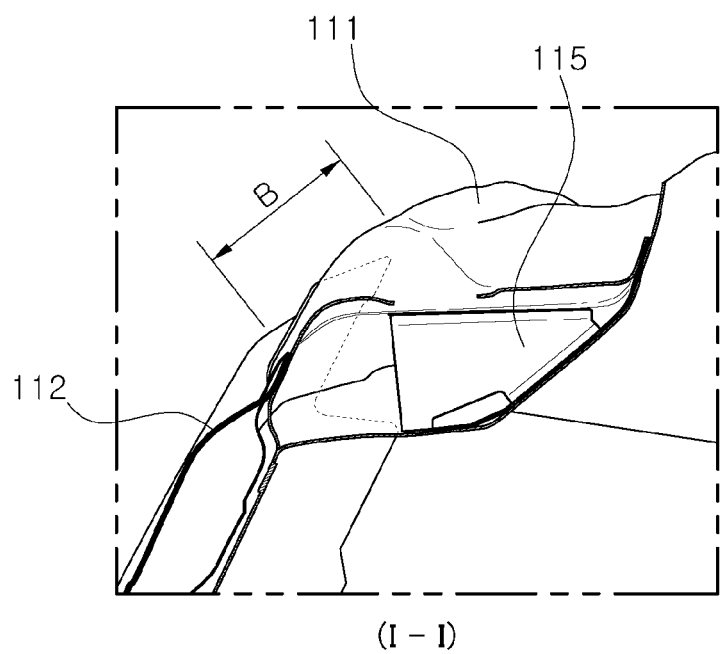
FIG. 5 is a cross-sectional view taken along line I-I of FIG. 3.
Figure 6:
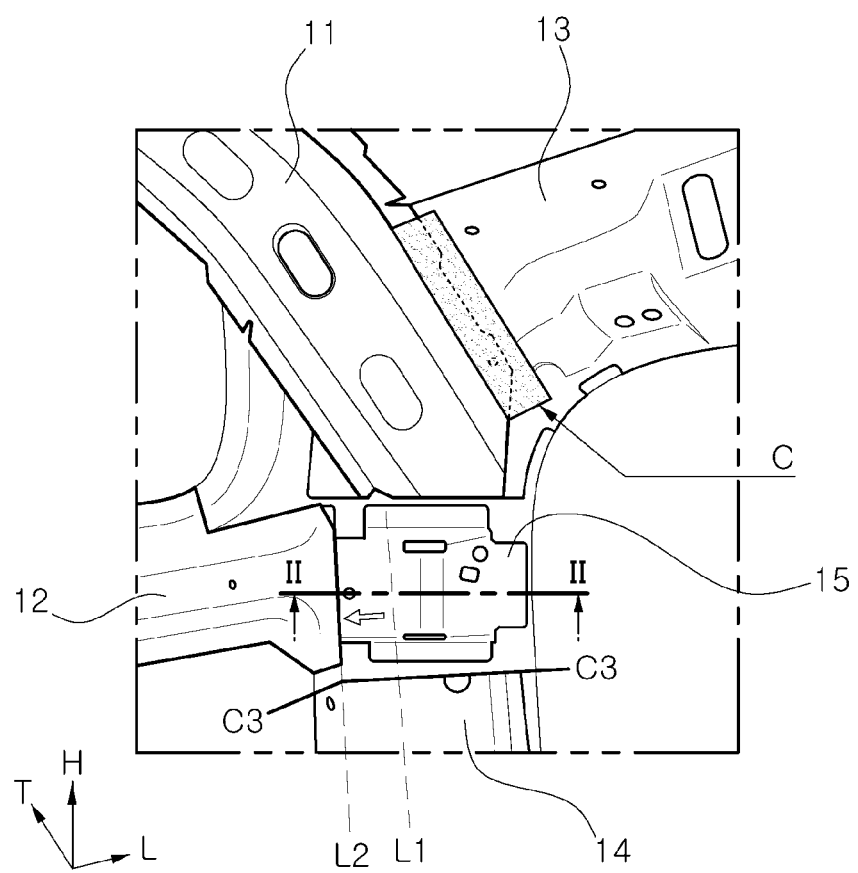
FIG. 6 is a perspective view illustrating an upper structure of a rear pillar of a vehicle according to embodiments of the present disclosure.

As shown in FIG. 6, the upper structure of a rear pillar of a vehicle with reinforced stiffness according to embodiments of the present disclosure includes a roof side member 11 disposed on a side surface of a roof in a length direction of a vehicle, a roof center member 13 disposed at a rear end of the roof in a width direction of the vehicle and connected to a side surface of a rear end of the roof side member 11 by bonding, and a seat belt mounting member 15 fastened to an upper portion of a tailgate side member 14 and connected to an end portion of the roof side member 11 by bonding. In FIG. 6, the internal shape of the tailgate side member 14 cut along line C3-C3 is shown.

In a vehicle, particularly, a vehicle such as a sport utility vehicle (SUV), in order to support the roof of the vehicle, the tailgate side member 14 in contact with the tailgate serves as a rear pillar which is a fourth pillar.

In the upper portion of the tailgate side member 14, the roof side member 11, which is disposed on the side surface of the roof in the length direction of the vehicle, is connected to the roof center member 13, which is disposed at the rear end of the roof in the width direction of the vehicle and connected to the side surface of the rear end of the roof side member 11 by bonding.

The roof side member 11 and the roof center member 13 are bonded and connected to each other. Conventionally, a partition wall member is applied to a portion where the roof side member 11 and the roof center member 13 are connected. However, in embodiments of the present disclosure, the roof side member 11 and the roof center member 13 are directly connected without the partition wall member. As the partition wall member is omitted, the number of parts is reduced.

To this end, the rear end of the roof side member 11 is formed to extend to be in contact with the seat belt mounting member 15.

A length of the roof center member 13 is reduced, and thus the roof center member 13 is formed only up to the side surface of the roof side member 11. In a state in which the roof center member 13 reaches the side surface of the roof side member 11, the roof side member 11 and the roof center member 13 are bonded and connected to each other (a portion indicated by C in FIG. 6).

The end portion of the roof side member 11 is bonded and connected to the seat belt mounting member 15 fastened to the upper portion of the tailgate side member 14. The roof side member 11 is formed in the length direction of the vehicle. However, the roof side member 11 may be formed to be bent toward the seat belt mounting member 15 so as to be connected thereto.

The roof center member 13 is indirectly connected to the seat belt mounting member 15 through the roof side member 11 without being directly connected to the seat belt mounting member 15.

The seat belt mounting member 15 is a member on which a seat belt of the rearmost seat in the vehicle is mounted. Since the roof side member 11 is also bonded to the seat belt mounting member 15, stiffness around the seat belt mounting member 15 is improved when compared to a case in which the seat belt mounting member 15 is bonded to only the tailgate side member 14.

The seat belt mounting member 15 is connected to not only the roof side member 11 by bonding, but also to a glass lower member 12 which supports a fixed glass installed on the side surface of the vehicle. The seat belt mounting member 15 is formed to extend toward the glass lower member 12 and is aligned at the same height as the glass lower member 12 so that a rear end of the glass lower member 12 is bonded to a side surface of the seat belt mounting member 15. Referring to FIG. 6, a front end of the seat belt mounting member 15 is shown to extend to line "L2" from line "L1" of the related art.

Meanwhile, although the end portion of the roof side member 11 has been described to extend to be connected to the seat belt mounting member 15, the end portion of the seat belt mounting member 15 may extend to be connected to the roof side member 11. Alternatively, both the roof side member 11 and the seat belt mounting member 15 may extend toward each other.

In addition, the seat belt mounting member 15 is connected to the glass lower member 12 by bonding in front of a portion where the roof side member 11 is in contact with the seat belt mounting member 15.

Figure 7:
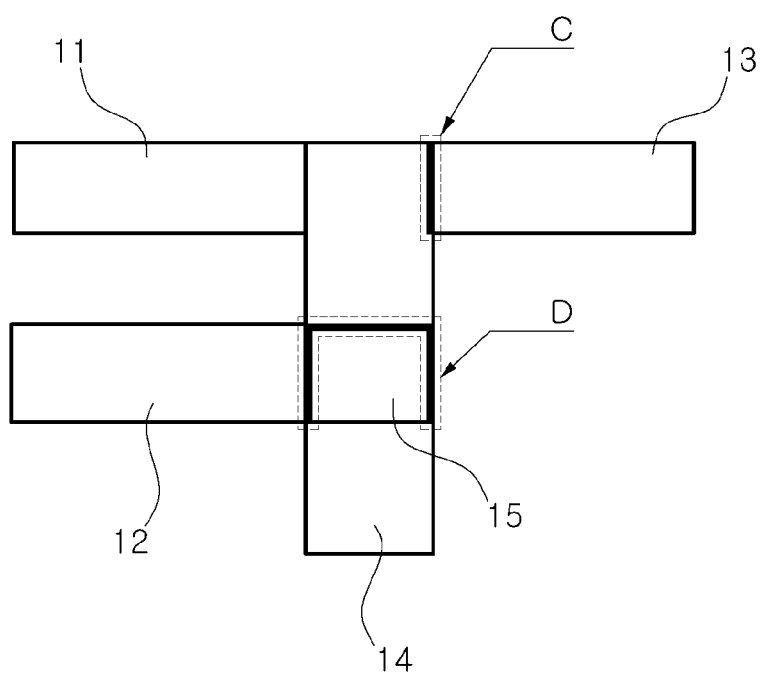
FIG. 7 is a schematic view illustrating a simplified model of the upper structure of the rear pillar of the vehicle according to embodiments of the present disclosure.

A circumference of the seat belt mounting member 15 is bonded to the roof side member 11 and the glass lower member 12 (see D in FIG. 7).

Figure 8:
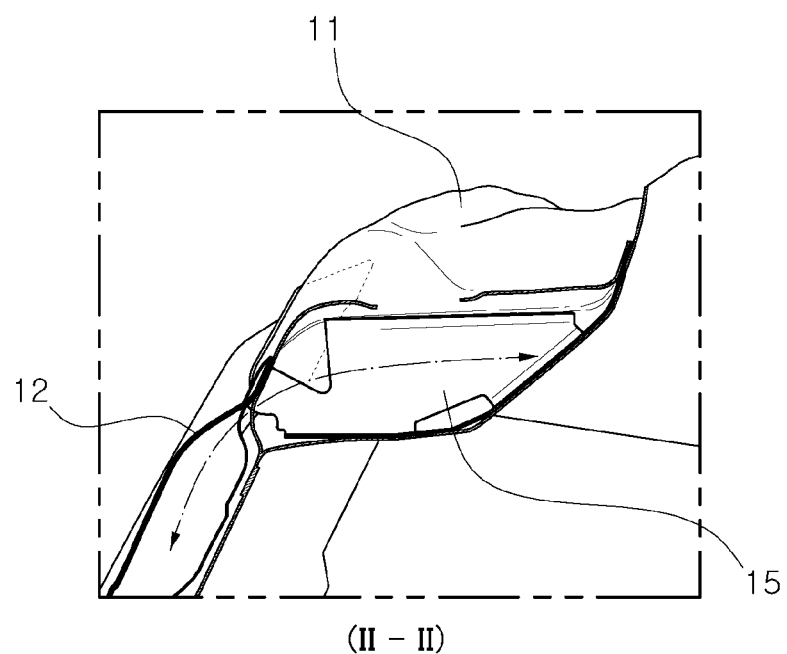
FIG. 8 is a cross-sectional view taken along line II-II of FIG. 6.

In addition, since the seat belt mounting member 15 and the glass lower member 12 are connected, continuity of a cross section of a lateral member between the seat belt mounting member 15 and the glass lower member 12 may be secured (see FIG. 8) so that frame stiffness of an entirety of the vehicle body is improved.

As described above, the tailgate side member 14, the roof side member 11, and the glass lower member 12 are bonded through the seat belt mounting member 15. Thus, connectivity between the members is reinforced through the seat belt mounting member 15 so that stiffness is improved. That is, the seat belt mounting member 15 is a joint part to which the members are connected and has a strong connection so that stiffness is ultimately improved.

In addition, local stiffness of the seat belt mounting member 15 is also improved.

In accordance with an upper structure of a rear pillar of a vehicle with reinforced stiffness according to embodiments of the present disclosure, which has the above-described configuration, a partition wall member is omitted, a roof side member and a roof center member are directly connected, and the roof side member, a glass lower member, and a tailgate side member are directly connected to a seat belt mounting member so that connectivity between the members can be improved, and thus stiffness of an upper portion of the rear pillar can be improved.

While embodiments of the present disclosure have been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. An upper structure of a rear pillar of a vehicle, the upper structure comprising:
a roof side member disposed on a side surface of a roof in a length direction of the vehicle;
a roof center member disposed at a rear end of the roof in a width direction of the vehicle and connected to a side surface of a rear end of the roof side member; and
a seat belt mounting member connected to an end portion of the roof side member, wherein a rear end of a glass lower member disposed below a fixed glass in the length direction of the vehicle is connected to a side surface of the seat belt mounting member.

2. The upper structure of claim 1, wherein the roof side member extends and is bent to be connected to the seat belt mounting member.

3. The upper structure of claim 1, wherein the roof center member is connected to the roof side member at a position spaced apart from the seat belt mounting member.

4. The upper structure of claim 1, wherein the seat belt mounting member is disposed to align with the glass lower member.

5. The upper structure of claim 1, wherein the seat belt mounting member is connected to the glass lower member in front of a portion where the roof side member is in contact with the seat belt mounting member.

6. The upper structure of claim 1, wherein the end portion of the roof side member extends to the seat belt mounting member, and wherein the roof side member and the seat belt mounting member are connected.

7. The upper structure of claim 1, wherein an end portion of the seat belt mounting member extends to the roof side member, and wherein the roof side member and the seat belt mounting member are connected.

8. The upper structure of claim 1, wherein a seat belt is installed at the seat belt mounting member.

9. An upper structure of a rear pillar of a vehicle, the upper structure comprising:
a roof side member disposed on a side surface of a roof in a length direction of the vehicle;
a roof center member disposed at a rear end of the roof in a width direction of the vehicle and connected to a side surface of a rear end of the roof side member; and
a seat belt mounting member connected to an end portion of the roof side member, wherein the seat belt mounting member is fastened to an upper portion of a tailgate side member.

10. A vehicle comprising:
a vehicle body comprising a roof;
a roof side member disposed on a side surface of the roof in a length direction of the vehicle body;
a roof center member disposed at a rear end of the roof in a width direction of the vehicle body and connected to a side surface of a rear end of the roof side member;
a seat belt mounting member connected to an end portion of the roof side member; and
a glass lower member disposed in the length direction of the vehicle and connected to a side surface of the seat belt mounting member.

11. The vehicle of claim 10, wherein the roof side member extends and is bent to be connected to the seat belt mounting member.

12. The vehicle of claim 10, wherein the roof center member is connected to the roof side member at a position spaced apart from the seat belt mounting member.

13. The vehicle of claim 10, further comprising a fixed glass disposed above the glass lower member.

14. The vehicle of claim 13, wherein the seat belt mounting member is disposed to align with the glass lower member.

15. The vehicle of claim 13, wherein the seat belt mounting member is connected to the glass lower member in front of a portion where the roof side member is in contact with the seat belt mounting member.

16. The vehicle of claim 10, wherein the end portion of the roof side member extends to the seat belt mounting member, and wherein the roof side member and the seat belt mounting member are connected.

17. The vehicle of claim 10, wherein an end portion of the seat belt mounting member extends to the roof side member, and wherein the roof side member and the seat belt mounting member are connected.

18. The vehicle of claim 10, further comprising a seat belt installed at the seat belt mounting member.

19. The vehicle of claim 10, further comprising a tailgate side member, wherein the seat belt mounting member is fastened to an upper portion of the tailgate side member.

20. The upper structure of claim 9, wherein the roof center member is connected to the roof side member at a position spaced apart from the seat belt mounting member.

* * * * *